P. McCOLLUM.
Gate.

No. 83,867. Patented Nov. 10, 1868.

PETER McCOLLUM, OF FAYETTE, MISSOURI.

Letters Patent No. 83,867, dated November 10, 1868.

IMPROVEMENT IN GATES.

The Schedule referred to in these Letters Patent and making part of the same.

*To all whom it may concern:*

Be it known that I, PETER McCOLLUM, of Fayette, in the county of Howard, and State of Missouri, have made certain new and useful Improvements in Gates; and I do hereby declare that the following is a full and clear description thereof, reference being had to the accompanying drawings, and to the letters of reference marked thereon.

This invention relates to a counterpoised gate, pivoted to its supporting-posts, so as to be raised or opened in a vertical plane. The gate is composed of an upper and a lower section, the lower one of which is hinged to the upper part, so as to be opened upward, so as to let small stock pass under the gate, while the upper portion of the gate remains closed for the stoppage of larger animals.

The lower hinged portion of the gate may be turned aside when the gate is thrown up or open, so as to enlarge the opened gateway.

To enable those skilled in the art to make and use my improved gate, I will proceed to describe its construction and operation.

Figure 1 of the drawings is a front elevation of the improved gate, showing it in its closed position.

Figure 3:
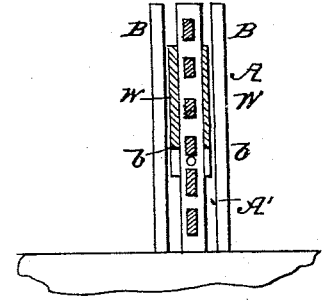
Figure 3 is a transverse central sectional elevation of the improved gate, looking toward the rear or pivot-posts.

The gate is formed of two parts, A and A', the upper part being pivoted to the rear posts B by means of a pivot-pin, $b$, which passes through the gate and posts. The rear post B is formed in two pieces, as best shown in fig. 3.

The top part of the gate A is formed of any desired number of rails $a$, and it is counterpoised on the pivot $b$ by means of the weight-box W. This weight-box is arranged to hold stones, or other suitable counterbalancing-material, and is arranged along the whole vertical line of the back part of the gate A, and is otherwise so arranged as to place the centre of gravity in or near a vertical line drawn through the pin $b$.

Figure 2:
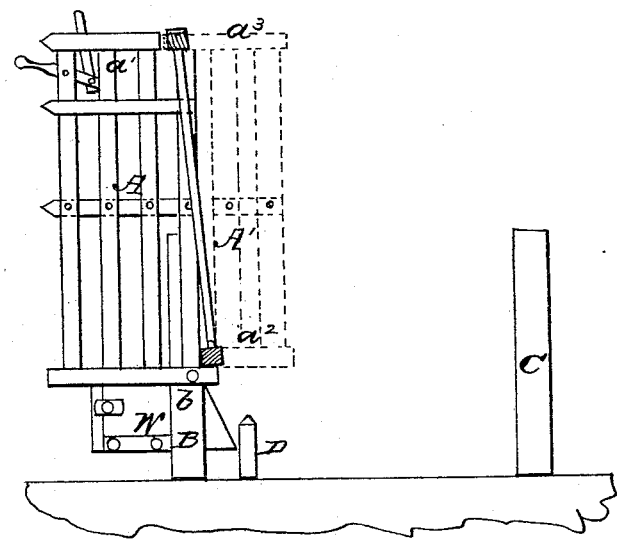
Figure 2 is a similar elevation, showing the gate open.

The gate is secured in its closed position by means of the latch $a'$, and when this is withdrawn from the post C, the whole gate may be tipped up, endwise, on its pivot $b$, as is shown in fig. 2.

The lower part A' is attached to the upper part A by means of the pivot-pin $a'$ and the pin $a$, on the outer end of the lower rail of the part A.

Figure 1:
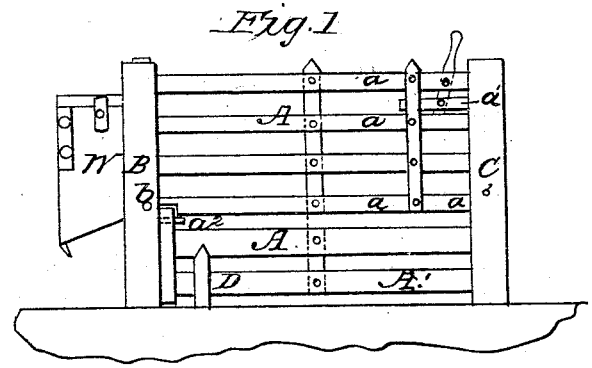

When the gate is closed, this bottom part of it may be raised up, so as to let hogs or other small stock pass under it, or it may be dropped down, as in fig. 1, so as to close the opening altogether.

When the gate is raised up, or opened, this bottom part may be swung to one side, as in fig. 2, so as to widen the opening.

Small fender-posts D, set in the ground by the side of the gate, will prevent injury to A' when opened.

Having described my invention,

What I claim, is—

The gate A A', when arranged in two parts, hinged together, so as to allow the bottom part to be folded up or thrown open, as described.

In testimony of which invention, I hereunto set my hand and seal, in presence of—

PETER McCOLLUM. [L. S.]

Witnesses:
M. RANDOLPH,
ROBERT BURNS.